May 25, 1965  B. H. KRYZER  3,185,302
REGENERANT SUPPLY SYSTEM FOR LIQUID TREATMENT APPARATUS
Filed May 2, 1962  2 Sheets-Sheet 2
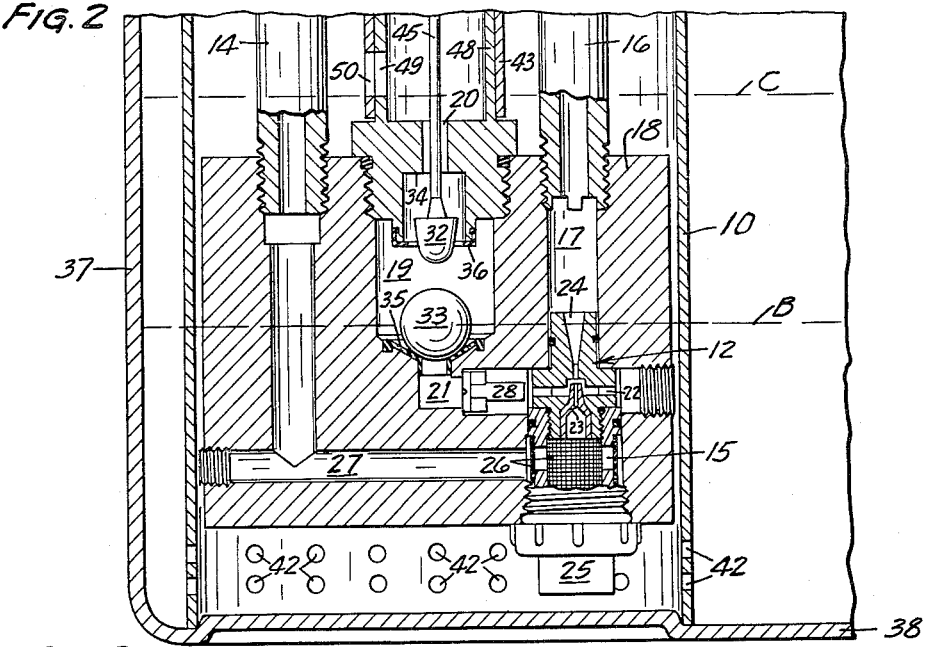
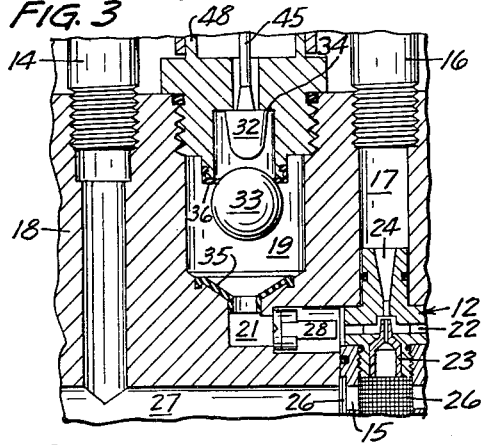
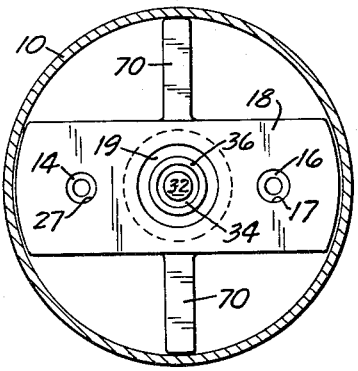
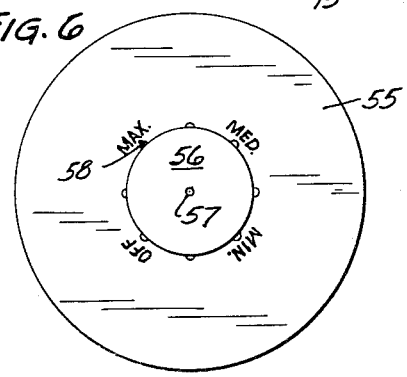
INVENTOR
BENJAMIN H. KRYZER
BY
John E. Stryker
ATTORNEY United States Patent Office 3,185,302
Patented May 25, 1965

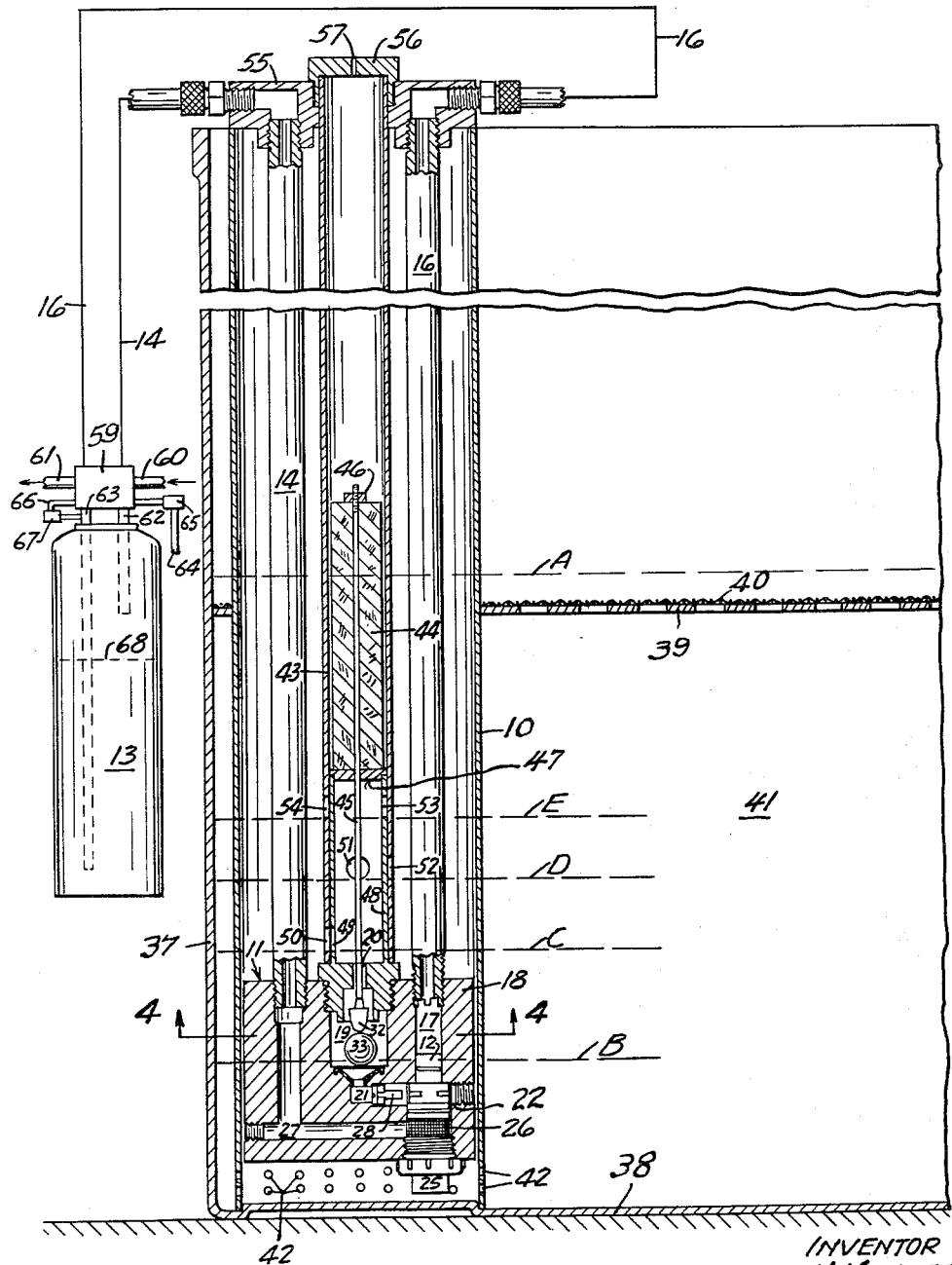

3,185,302
REGENERANT SUPPLY SYSTEM FOR LIQUID
TREATMENT APPARATUS
Benjamin H. Kryzer, St. Paul, Minn., assignor to Union
Tank Car Company, Chicago, Ill., a corporation of
New Jersey
Filed May 2, 1962, Ser. No. 191,767
4 Claims. (Cl. 210—126)

This application is a continuation-in-part of my copending application Serial No. 155,993, filed November 30, 1961 and now abandoned.

This invention relates to a regenerant supply system for liquid treatment apparatus of the type having a treatment tank and liquid regenerant container, the invention being particularly, although not exclusively, adapted for use in connection with water softening apparatus of the automatic type.

It is an object of my invention to provide a system of the class described including an injector which is submerged in the regenerant liquid and arranged to discharge the liquid upwardly, liquid under pressure for operating the injector being supplied through one conduit and the regenerant being passed from the injector to the treatment tank through another conduit, whereby malfunctioning of the injector due to the entry of air into the flow system is minimized.

A further object is to provide a combination injector and float actuated valve for controlling the quantity of regenerant which is fed to the injector, both the float actuated valve and injector being submerged in regenerant in a reservoir or container and the injector being operative to supply regenerant to a treatment tank through connecting conduit means and make-up liquid being supplied to the reservoir or regenerant container by reverse flow through the conduit means and through the injector and float valve.

Another object is to provide in a system of the class described a combination float valve and injector, wherein the valve controls flow of regenerant to the injector and has improved valve closure members disposed in a chamber of the valve submerged in the regenerant liquid, and adapted to alternately limit the quantity of liquid fed to a regenerant container and the quantity of regenerant fed to the injector in response to changes in the level of liquid in the regenerant container and valve chamber.

My invention also includes certain other novel features of construction which will be more fully pointed out in the following specification and claims.

Referring to the accompanying drawing which illustrates, by way of example and not for the purpose of limitation, a preferred embodiment of my invention:

FIGURE 1 is a part vertical sectional view and part schematic view showing my improved regenerant supply system for liquid treatment apparatus of the water softener type, with the valve members in an open position as during the operation of the injector;

FIG. 2 is a fragmentary vertical sectional view showing the float valve injector assembly with the valve closure members in the position they occupy when the regenerant reaches a predetermined low level in the regenerant container;

FIG. 3 is a similar fragmentary vertical sectional view showing the valve members in their upwardly closed position wherein they cut off the supply of make-up liquid to the regenerant container;

FIG. 4 is a horizontal sectional view taken on the line 4—4 of FIG. 1;

FIG. 5 is a perspective view showing the flow control device which is interposed in the passage extending from the lower end of the valve chamber to the ejector suction chamber, and FIG. 6 is a plan view of the regenerant container showing the manual volume control.

As indicated in FIG. 1, my improved regenerant supply system has a liquid regenerant container indicated generally by the numeral 10, a float actuated valve indicated generally at 11, and an aspirator pump injector indicated generally at 12. The valve 11 and injector 12 are normally submerged in regenerant in the container 10. A treatment tank indicated at 13 is connected by a first conduit 14 to an inlet chamber 15 of the injector 12, and a second conduit 16 connects the tank 13 to an outlet chamber 17 of the injector 12. The valve 11 has a casing body 18 formed with a valve chamber 19 having ports communicating respectively with an upwardly extending passage 20 and a passage 21 connecting the lower end of the chamber 19 with a suction chamber 22 of the injector 12. A nozzle 23 of the injector is disposed to receive liquid under pressure from the inlet chamber 15 and to discharge the liquid at high velocity upwardly to and through a venturi passage 24 which in turn discharges into the outlet chamber 17 and conduit 16, thus drawing liquid under subatmospheric pressure from the suction chamber 22.

The several members of the injector are removably mounted in a vertically extending bore formed in the valve body 18. This injector unit includes a screw threaded member having a head 25 which is accessible from the lower side of the valve body 18 for removing the unit for cleaning or replacement. The screw threaded member forms the inlet chamber 15 and the liquid under pressure is admitted to this chamber through fine screen members 26. Another passage 27 is formed in the valve body 18 to place the lower end of the conduit 14 in communication with the chamber 15 of the injector.

A flow control device indicated generally at 28 is interposed in the passage 21 to limit the rate of flow to the valve chamber 19 to a rate substantially lower than the rate of flow from the valve chamber to the suction chamber 22. As shown in detail in FIG. 5, the flow control device 28 has a circular head 29 formed with a cross slot 30 in its seat face which permits flow at a restricted, suitably low rate from the chamber 22 to the chamber 19. The head 29 fits loosely in the passage 21 so that when regenerant liquid is withdrawn from the chamber 19 under subatmospheric pressure in the chamber 22, the device 28 moves to the right as seen in FIG. 1 to increase the rate of flow past the head 29 and a guide stem 31 to the suction chamber 22.

Valve closure members 32 and 33 are contained in the chamber 19 and movable therein to and from annular seats 34 and 35 respectively. The seat 34 surrounds the lower end of the passage 20 which is closed by the member 32 when the liquid in the container 10 reaches a predetermined high level such as that indicated at A in FIG. 1. Valve closure member 33 is adapted to float in the liquid in the chamber 19, being formed from material having specific gravity less than 1, and is preferably spherical in shape. This member 33 closes the passage 21 at the seat 35 surrounding the intake end of the passage, as indicated in FIG. 2, when the liquid regenerant in the chamber 19 descends to a predetermined low level, such as that indicated at B.

Valve seats 34 and 35 extend substantially horizontally, and a third substantially horizontal seat 36 is provided for the closure member 33 at an elevation intermediate the elevation of the seats 34 and 35. The closure member 33 is adapted to float to its closed position on the seat 36 substantially simultaneously with the closing of the member 32 at its seat 34. By this arrangement of the closure members 32 and 33 and the seats 34 and 36, flow of liquid for replacing the regenerant which has been withdrawn from the container 10 is cut off by both of the members 32 and 33, thereby effectively preventing leakage of replacement liquid into the regenerant container during long periods of time when the liquid in the chamber 19 is under full line pressure, as during liquid treatment periods between regeneration periods.

As shown, the container 10 is submerged to an elevation such as that indicated at A in liquid contained in the reservoir having side walls 37, a bottom 38 and a foraminous horizontal platform 39 having a screen 40 covering its upper face. The platform supports a reserve supply of solid regenerating material, e.g., the granular or pelletized common salt used for regenerating ion exchange resins of common type. At the start of a regenerating cycle, the liquid regenerant may fill the container 10 and reservoir to an elevation such as that indicated at A above the platform 39, and a chamber 41 below the platform is filled with a concentrated solution of regenerant. This solution is fed through openings 42 formed in the walls of the container 10 below the valve body 18. As the regenerant liquid is withdrawn from the container 10 and subsequently replaced by make-up liquid, the level of liquid in the reservoir descends and rises with that in the container 10.

A manually operable control device is provided for adjusting the quantity of regenerant that is withdrawn from the container 10 during each regenerating operation or cycle. This device includes a tubular member 43 extending upwardly from the valve body 18 to the top of the container 10. A float body 44 is contained in the member 43 and is connected to the valve closure member 32 by a stem 45. The valve stem extends axially through the float body 44 and is connected thereto by a member 46. Downward movement of the float body 44 in the tubular member 43 is limited by a cap member 47 fixed on the upper end of a cylindrical chamber 48 which is disposed between the stem 45 and lower end portion of the tubular member 43. The tubular member 43 fits closely in contact with the exterior surface of the cylindrical chamber 48 and is rotatable about the axis thereof. Passages for the flow of liquid between the interior of the chamber 48 and container 10 are provided at three different elevations. Thus at the low level an opening 49 in the chamber 48 is arranged to register with an opening 50 in the tubular member 43. An opening 51 in the chamber 48 is arranged to register with the opening 52 in the member 43 at an intermediate elevation, and an opening 53 in the chamber 48 is arranged to register with an opening 54 in the member 43 at a predetermined high level. The tubular member 43 may be turned about its axis through successive angles of 90° from the position shown in FIG. 1 to place the opening 51 in registry with the opening 52 or the opening 53 in registry with the opening 54.

At its upper end the tubular member 43 is rotatable in a suitable bearing formed in a cover member 55 for the container 10, and a manually operable knob 56 is secured to the end of the member 43 for manually turning it. A vent opening 57 is formed in the knob 56 to allow air to pass to and from the interior of the member 43. As shown in FIG. 6, a pointer 58 projects from the knob 56 and the upper surface of the cover 55 is marked with a dial for indicating the position of the regenerant control by reference to the pointer 58. Markings of the dial indicate the several angular positions to which the knob 56 may be turned to cause the selective withdrawal of various amounts of regenerant liquid during each regenerating cycle.

As indicated schematically in FIG. 1, a control valve 59 may be interposed between the treatment tank 13 and conduits 14 and 16 respectively. This valve may be a multiple port valve such as that described in my copending application for patent entitled "Multiple Flow Valve Control for Liquid Treatment Apparatus," Serial Number 190,995, filed April 30, 1962, and assigned to the same assignee as this invention. Raw water or other liquid to be treated may be supplied to the valve 59 under pressure through a conduit 60 and treated liquid may be discharged through a service pipe 61. The flow system may also include a conduit 62 communicating with the upper portion of the tank, a conduit 63 communicating with the lower portion of the tank 13, a drain outlet 64 under control of a valve 65 and a backwash by-pass conduit 66 having a valve 67 interposed therein, as more fully described in said copending application. The treatment tank 13 may contain a body of ion exchange water softening material indicated at 68.

As shown in FIGS. 1 and 4, the valve body 18 is suspended in the container 10 by the vertically extending portions of the conduits 14 and 16 and tubular member 43 which is connected to the cover 55. The valve body 18 fits loosely in the container 10 and is provided with laterally projecting studs 70 (FIG. 4) to space opposite sides of the valve body from the container walls.

*Operation*

In operation it may be assumed that when the feeding of regenerant liquid from the container 10 to the treatment tank 13 is to start, the regenerant liquid is at the high level indicated at A in FIG. 1, and that the control tube 43 has been set in the position for maximum regenerant draw indicated in FIGS. 1 and 6. At this time the valve closure members 32 and 33 are in their upwardly closed positions indicated in FIG. 3. Regenerant flow through the conduit 16 to the valve 59 and thence to the treatment tank 13 is initiated by supplying liquid under pressure to the conduit 14. This liquid, under full line pressure, flows through the passage 27 to the chamber 15 of the injector, thence through the nozzle 23 to the venturi tube passage 24 and outlet chamber 17. Subatmospheric pressure is thereby established in the suction chamber 22 which is in communication with the chamber 19 through the passage 21. The resulting reduced pressure in the chamber 19 draws the closure members 33 and 32 downwardly off their seats 36 and 34 and allows regenerant liquid to flow into the passage 20 and chamber 19 through the openings 50 and 49 in the tubular member 43 and chamber 48. Regenerant solution is thereby caused to flow through the conduit 16 to the valve 59 and thence through the treatment bed 68 via conduits 63 and 62. The effluent flows to waste through the drain conduit 64, the valve 65 being open.

Such flow of regenerant liquid to the treatment tank continues through the openings 50 and 49 until the level of liquid in the container 10 descends to the elevation indicated at C, FIG. 1. Thereupon, the flow to the chamber 48 stops but flow continues to and through the passage 21 until the closure member 33 reaches a low level position such as that indicated at B in FIG. 2, wherein this member closes at its seat 35 thereby stopping flow of liquid and preventing the entry of air into the passage 21 and injector suction chamber 22. Flow of water through the treatment tank 13 to the drain conduit 64 is usually continued to flush and/or backwash the treatment bed for a suitable period of time.

The quantity of regenerant drawn from the container 10 during the regenerant supply cycle may be adjusted by merely turning the knob 56 from the position shown in FIGS. 1 and 6 to a position where the opening 51 registers with the opening 52 in the tubular member 43, or to the position in which the opening 53 registers with the opening 54. With the first of these adjustments the quantity of brine represented by the descent from level A to level D will be fed to the treatment tank, and with the device in the third or minimum draw position the regenerant will descend only from the level A to the level E indicated in FIG. 1. By turning the knob 56 counterclockwise 90° from the position shown in FIG. 6, all flow of brine to the interior of the cylindrical chamber 48 may be cut off.

To restore the level of liquid in the reservoir 37 and container 10 from any of the low levels indicated at C, D or E to the high level A, the direction of flow of make-up liquid through the conduit 16 may be reversed. Liquid under pressure may also be supplied through the conduit 14. In either event, the make-up liquid passes through the injector 12 and passage 21 at the rate controlled by the device 28. The flow is then upwardly into and through the chamber 19 past the closure member 33 which floats to an open position in contact with the lower end of the closure member 32. From the passage 20, the flow is to the chamber 48 and thence through an opening therein in registry with one in the tubular member 43 of the container 10 until the liquid level reaches the high level A in the container 10. This make-up liquid flow continues until the float body 44 rises to a high level position thereby closing the member 32 at its seat 34, as the member 33 closes at its seat 36 to cut off flow into the regenerant container.

By limiting the rate of flow of refill liquid into and upwardly through the chamber 19, I guard against premature closing of the floating closure member 33 at its seat 36, thereby insuring approximately simultaneous closing of the valve member 32 at its seat 34 and the member 33 at its seat 36.

An important feature of my invention is the arrangement of the injector below the level of the liquid in the container 10 and the upwardly directed discharge from the venturi passage 24. Extensive tests have shown that by this arrangement of the injector elements malfunctioning as a result of the entrapment of air in the injector is substantially eliminated or greatly reduced as compared with the ordinary arrangement of injectors which discharge the effluent in a downward or lateral direction. It has been found that water under ordinary line pressures within the range 20 to 50 p.s.i. carries air in solution and that the reduced pressure in the suction chamber of the injector causes the separation and accumulation of air bubbles in the suction chambers. With my arrangement of the upwardly discharging, submerged injector such accumulations of air readily escape through the venturi passage 24.

My novel location and arrangement of the injector also increases its efficiency by reason of the fact that the length of the passage leading from the source of regenerant to the suction chamber has been reduced to a minimum. Efficiency and economy of manufacture and maintenance are also improved by molding or casting the injector casing as an integral part of the float valve body.

I claim:
1. A regenerant supply system for liquid treatment apparatus of the type having a treatment tank and a regenerant container comprising:
   (a) a chambered injector normally submerged in liquid in said container and having inlet and outlet chambers, a nozzle and a suction chamber;
   (b) a first conduit means connecting said inlet chamber to a source of water under pressure;
   (c) a second conduit means connecting said outlet chamber to said tank;
   (d) a valve body normally submerged in liquid in said container and having a valve chamber and first and second ports communicating with said chamber;
   (e) a first passage extending upwardly from said valve chamber and connecting said first port to the interior of said container;
   (f) a second passage entirely located below the lowest level reached by liquid in said container, and connecting said second port to the suction chamber of said injector;
   (g) a first valve seat surrounding said first port;
   (h) a first valve closure member movable in said valve chamber to and from closed position on said first seat,
   (i) a float operatively connected to said valve closure member for moving it to and from said seat in response to changes in the level of liquid in said container,
   (j) a second valve seat surrounding said second port and a second valve closure member movable in said valve chamber to and from closed position on said second seat, said second valve seat being disposed substantially horizontally at the lower side of said chamber and said second closure member being a float member having specific gravity less than 1 and being formed to close said second port when the liquid level in said chamber descends to a predetermined low level, and
   (k) a third substantially horizontally disposed valve seat surrounding said first passage in downwardly spaced relation to said first seat and upwardly spaced relation to said second seat, said second closure member being formed to close said first passage at said third seat upon the rise of liquid in said valve chamber to a predetermined high level, and means attached to said first closure member and movable therewith, the last mentioned means protruding below said third seat, while said first closure member is moving toward closed position, a distance sufficient to prevent said second closure member from rising to close against said third seat until substantially simultaneously with the closing of said first closure member at said first seat.

2. A regenerant supply system in accordance with claim 1 in which said injector outlet chamber is positioned above the discharge end of said nozzle to receive regenerant liquid therefrom.

3. A regenerant supply system in accordance with claim 1 in which said injector is removably mounted in a substantially cylindrical, vertically elongated bore formed in said valve body.

4. A regenerant supply system in accordance with claim 1 including a flow control device interposed in said second passage and adapted to limit the rate of flow to said valve chamber to a rate substantially lower than the rate of flow from said valve chamber to said suction chamber.

References Cited by the Examiner
UNITED STATES PATENTS

| 1,521,817 | 1/25 | Jerdone | 137—577 X |
| 1,837,136 | 12/31 | Roberts | 137—604 X |
| 3,028,875 | 4/62 | Alguire | 137—391 |
| 3,049,237 | 8/62 | Whitlock et al. | 210—191 X |
| 3,083,728 | 4/63 | Schulze et al. | 210—191 X |
| 3,089,508 | 5/63 | Schulze et al. | 137—577 X |
| 3,095,005 | 6/63 | Thompson | 137—426 X |

FOREIGN PATENTS

| 576,560 | 4/46 | Great Britain. |

REUBEN FRIEDMAN, *Primary Examiner.*
HERBERT L. MARTIN, *Examiner.*